(12) United States Patent
Fuchs et al.

(10) Patent No.: US 8,760,859 B2
(45) Date of Patent: Jun. 24, 2014

(54) ELECTROMAGNETICALLY-SHIELDED PORTABLE STORAGE DEVICE

(75) Inventors: Greg Fuchs, River Falls, WI (US); Gale Nordling, Excelsior, MN (US); George Anderson, Champlin, MN (US); David Blake Jackson, Excelsior, MN (US)

(73) Assignee: Emprimus, LLC, St. Louis Park, MN (US)

( * ) Notice: Subject to any disclaimer, the term of this patent is extended or adjusted under 35 U.S.C. 154(b) by 492 days.

(21) Appl. No.: 13/100,071

(22) Filed: May 3, 2011

(65) Prior Publication Data

US 2011/0267765 A1 Nov. 3, 2011

Related U.S. Application Data

(60) Provisional application No. 61/330,752, filed on May 3, 2010, provisional application No. 61/330,762, filed on May 3, 2010.

(51) Int. Cl.
*H05K 9/00* (2006.01)

(52) U.S. Cl.
USPC ...... 361/679.33; 361/800; 361/818; 174/383; 174/387

(58) Field of Classification Search
USPC ............. 361/816, 818, 800, 679.33; 174/383, 174/387
See application file for complete search history.

(56) References Cited

U.S. PATENT DOCUMENTS

| | | | |
|---|---|---|---|
| 3,009,984 A | 11/1961 | Lindgren | |
| 3,075,818 A | 1/1963 | Fay | |
| 3,158,016 A | 11/1964 | Fay | |
| 3,189,394 A | 6/1965 | Fay | |
| 3,231,663 A | 1/1966 | Schwartz | |
| 3,297,383 A | 1/1967 | Fay | |

(Continued)

FOREIGN PATENT DOCUMENTS

| | | |
|---|---|---|
| EP | 0 668 692 A1 | 8/1995 |
| EP | 1 114 423 B1 | 2/2007 |
| GB | 294513 | 7/1928 |
| JP | 11-239288 | 8/1999 |

OTHER PUBLICATIONS

Military Handbook 235-1B, Electromagnetic (Radiated) Environment Considerations for Design and Procurement of Electrical and Electronic Equipment, Subsystems and Systems, Part 1B, General Guidance, 20 Pages, 1993.

(Continued)

*Primary Examiner* — Hung Ngo
(74) *Attorney, Agent, or Firm* — Merchant & Gould P.C.

(57) ABSTRACT

Electromagnetically shielded portable storage devices are disclosed. One such device includes an electromagnetically shielded enclosure having an interior volume, the electromagnetically shielded enclosure including a plurality of shielded walls and sized to be manually carried by a person. The interior volume of the enclosure is isolated from high-frequency electromagnetic energy generated external to the enclosure. The device includes at least one storage device positioned within the interior volume, and at least one communicative connection extending from the at least one storage device to a communicative socket accessible external to the electromagnetically shielded enclosure. The at least one communicative connection is configured to allow access to the storage device by a computing system external to the electromagnetically shielded enclosure. The device also includes an electrical filter positioned at least partially within the electromagnetically shielded enclosure, and including a low-pass filter selected to prevent spurious or intentional conductive high-frequency electromagnetic energy from entering the interior volume via the communicative connection.

20 Claims, 8 Drawing Sheets

(56) References Cited

U.S. PATENT DOCUMENTS

| | | | |
|---|---|---|---|
| 3,962,550 A | 6/1976 | Kaiserswerth | |
| D245,303 S | 8/1977 | Gazarek | |
| 4,060,709 A | 11/1977 | Hanson | |
| 4,066,305 A | 1/1978 | Gazarek | |
| D248,003 S | 5/1978 | Gazarek | |
| 4,102,554 A | 7/1978 | Reimer | |
| 4,115,656 A | 9/1978 | Aitel | |
| 4,177,353 A | 12/1979 | McCormack | |
| 4,532,513 A * | 7/1985 | Halvorson | 340/971 |
| 4,655,012 A | 4/1987 | Downey et al. | |
| 4,660,014 A | 4/1987 | Wenaas et al. | |
| 4,677,251 A | 6/1987 | Merewether | |
| 4,691,483 A | 9/1987 | Anderson | |
| 4,748,790 A | 6/1988 | Frangolacci | |
| 4,755,630 A | 7/1988 | Smith et al. | |
| H000526 H | 9/1988 | Miller | |
| 4,787,181 A | 11/1988 | Witten et al. | |
| D300,097 S | 3/1989 | Cook | |
| 4,884,171 A | 11/1989 | Maserang et al. | |
| 4,894,489 A | 1/1990 | Takahashi et al. | |
| 4,913,476 A | 4/1990 | Cook | |
| 5,045,636 A | 9/1991 | Johnasen et al. | |
| 5,079,388 A | 1/1992 | Balsells | |
| 5,117,066 A | 5/1992 | Balsells | |
| 5,136,453 A | 8/1992 | Oliver | |
| 5,148,111 A | 9/1992 | Shiloh et al. | |
| 5,179,489 A | 1/1993 | Oliver | |
| 5,184,311 A | 2/1993 | Kraus et al. | |
| 5,190,479 A | 3/1993 | Jordi | |
| 5,191,544 A | 3/1993 | Benck et al. | |
| 5,241,132 A | 8/1993 | McCormack | |
| 5,436,786 A | 7/1995 | Pelly et al. | |
| 5,465,534 A | 11/1995 | Mittag | |
| 5,594,200 A | 1/1997 | Ramsey | |
| 5,600,290 A | 2/1997 | Anderson, II | |
| 5,685,358 A | 11/1997 | Kawasaki et al. | |
| 5,751,530 A | 5/1998 | Pelly et al. | |
| 5,828,220 A | 10/1998 | Carney et al. | |
| 5,983,578 A | 11/1999 | Huttie et al. | |
| 6,090,728 A | 7/2000 | Yenni, Jr. et al. | |
| 6,157,546 A | 12/2000 | Petty et al. | |
| 6,185,065 B1 | 2/2001 | Hasegawa et al. | |
| 6,210,787 B1 | 4/2001 | Goto et al. | |
| 6,292,373 B1 | 9/2001 | Li et al. | |
| 6,320,123 B1 | 11/2001 | Reimers | |
| 6,324,075 B1 | 11/2001 | Unrein et al. | |
| 6,346,330 B1 | 2/2002 | Huang et al. | |
| 6,377,473 B1 | 4/2002 | Huang et al. | |
| 6,380,482 B1 | 4/2002 | Norte et al. | |
| 6,426,459 B1 | 7/2002 | Mitchell | |
| 6,442,046 B1 | 8/2002 | Sauer | |
| 6,485,595 B1 | 11/2002 | Yenni, Jr. et al. | |
| 6,542,380 B1 | 4/2003 | Hailey et al. | |
| 6,542,384 B1 | 4/2003 | Radu et al. | |
| 6,613,979 B1 | 9/2003 | Miller et al. | |
| 6,683,245 B1 | 1/2004 | Ogawa et al. | |
| 6,838,613 B2 | 1/2005 | Kopf | |
| 6,870,092 B2 | 3/2005 | Lambert et al. | |
| 6,872,971 B2 | 3/2005 | Hutchinson et al. | |
| 6,891,478 B2 | 5/2005 | Gardner | |
| 7,071,631 B2 | 7/2006 | Howard, II | |
| 7,210,557 B2 | 5/2007 | Phillips et al. | |
| 7,258,574 B2 | 8/2007 | Barringer et al. | |
| 7,369,416 B2 | 5/2008 | Plabst | |
| 7,400,510 B1 * | 7/2008 | Milligan et al. | 361/752 |
| 7,418,802 B2 | 9/2008 | Sarine et al. | |
| 7,420,742 B2 | 9/2008 | Wood et al. | |
| 7,475,624 B1 | 1/2009 | Daily | |
| 7,498,524 B2 | 3/2009 | Brench | |
| 7,504,590 B2 | 3/2009 | Ball | |
| 7,512,430 B2 | 3/2009 | Nakamura | |
| 7,515,219 B2 | 4/2009 | Bozzer et al. | |
| 7,560,135 B2 | 7/2009 | Kotsubo et al. | |
| 7,561,444 B2 | 7/2009 | He | |
| 7,576,289 B2 | 8/2009 | Kessel | |
| 7,589,943 B2 | 9/2009 | Ramirez et al. | |
| 7,710,708 B2 | 5/2010 | Park et al. | |
| 7,839,020 B2 | 11/2010 | Nakanishi | |
| 8,085,554 B2 | 12/2011 | Holdredge et al. | |
| 8,351,221 B2 | 1/2013 | Siomkos et al. | |
| 8,358,512 B2 | 1/2013 | Shiroishi et al. | |
| 8,358,515 B2 | 1/2013 | Chen et al. | |
| 8,373,998 B2 | 2/2013 | Ricci et al. | |
| 8,406,012 B2 | 3/2013 | Kim | |
| 2001/0046128 A1 | 11/2001 | Ogata | |
| 2003/0024172 A1 | 2/2003 | Lyons et al. | |
| 2003/0174487 A1 | 9/2003 | Garmong | |
| 2004/0112205 A1 | 6/2004 | MacDougall | |
| 2004/0232847 A1 | 11/2004 | Howard, II | |
| 2005/0174749 A1 | 8/2005 | Liikamaa et al. | |
| 2006/0272857 A1 | 12/2006 | Arnold | |
| 2006/0274517 A1 | 12/2006 | Coffy | |
| 2007/0025095 A1 | 2/2007 | Beall et al. | |
| 2007/0105445 A1 | 5/2007 | Manto et al. | |
| 2007/0126871 A1 | 6/2007 | Henninger, III et al. | |
| 2007/0127129 A1 | 6/2007 | Wood et al. | |
| 2007/0158914 A1 | 7/2007 | Tammaro et al. | |
| 2008/0050172 A1 | 2/2008 | Simola et al. | |
| 2008/0080158 A1 | 4/2008 | Crocker et al. | |
| 2008/0250726 A1 | 10/2008 | Slagel et al. | |
| 2009/0067141 A1 | 3/2009 | Dabov et al. | |
| 2009/0125316 A1 | 5/2009 | Moore | |
| 2009/0140499 A1 | 6/2009 | Kline | |
| 2009/0229194 A1 | 9/2009 | Armillas | |
| 2009/0244876 A1 | 10/2009 | Li et al. | |
| 2009/0268420 A1 | 10/2009 | Long | |
| 2009/0278729 A1 | 11/2009 | Bosser et al. | |
| 2009/0291608 A1 | 11/2009 | Choi et al. | |
| 2010/0103628 A1 | 4/2010 | Steffler | |
| 2010/0116542 A1 | 5/2010 | Sugihara et al. | |
| 2010/0128455 A1 | 5/2010 | Ophoven et al. | |
| 2010/0208433 A1 | 8/2010 | Heimann et al. | |
| 2010/0315792 A1 | 12/2010 | Jones | |
| 2011/0088940 A1 | 4/2011 | Nordling et al. | |
| 2011/0222249 A1 | 9/2011 | Ruehl et al. | |
| 2013/0170159 A1 | 7/2013 | Jiang | |

OTHER PUBLICATIONS

Military Handbook 237B, Department of Defense Handbook, Guidance for Controlling Electromagnetic Environmental Effects on Platforms, Systems, and Equipment, 248 Pages, 1997.

Military Handbook 253, Guidance for the Design and Test of Systems Protected Against the Effects of Electromagnetic Energy, 27 Pages, 1978.

Military Handbook 273, Survivability Enhancement, Aircraft, Nuclear Weapon Threat, Design and Evaluation Guidelines, 228 Pages, 1983.

Military Handbook 411B, Power and the Environment for Sensitive DoD Electronic Equipment (General), vol. 1, 658 Pages, 1990.

Military Handbook 419A, Grounding, Bonding, and Shielding for Electronic Equipments and Facilities, vol. 1 of 2 Volumes, Basic Theory, 812 Pages, 1987.

Military Handbook 1857, Grounding, Bonding and Shielding Design Practices, 185 Pages, 1998.

Military Handbook 5961A, List of Standard Semiconductor Devices, 33 pages, 1999.

Military Standard 188-124B, Grounding, Bonding and Shielding, for Common Long Haul/Tactical Communication Systems Including Ground Based Communications-Electronics Facilities and Equipments, 41 Pages, 1992.

Military Standard 188-125-1, Department of Defense Interface Standard, High-Altitude Electromagnetic Pulse (HEMP) Protection for Ground-Based C41 Facilities Performing Critical, Time-Urgent Missions (Part 1—Fixed Facilities), 107 Pages, 1998.

Military Standard 188-125-2, Department of Defense Interface Standard, High-Altitude Electromagnetic Pulse (HEMP) Protection for Ground-Based C41 Facilities Performing Critical, Time-Urgent Missions (Part 2—Transportable Systems), 148 Pages, 1999.

Military Standard 188-125, High-Altitude Electromagnetic Pulse (HEMP) Protection for Ground-Based C41 Facilities Performing Critical, Time-Urgent Missions (vol. 1—Fixed Facilities), 114 Pages, Feb. 1994.

(56) References Cited

OTHER PUBLICATIONS

Military Standard 220C, Department of Defense—Test Method Standard—Method of Insertion Loss Measurement, 19 Pages, 2009.
Military Standard 285—Notice of Cancellation—MIL-STD-285, dated 1956 canceled, 17 Pages, 1997.
Military Standard 285, Military Standard Attenuation Measurements for Enclosures, Electromagnetic Shielding, for Electronic Test Purposes, 15 Pages, 1956.
Military Standard 461C, Electromagnetic Emission and Susceptibility Requirements for the Control of Electromagnetic Interference, 183 Pages, 1986.
Military Standard 461E, Requirements for the Control of Electromagnetic Interference Characteristics of Subsystems and Equipment, 253 Pages, 1999.
Military Standard 461F, Requirements for the Control of Electromagnetic Interference Characteristics of Subsystems and Equipment, 269 Pages, 2007.
Military Standard 462, Electromagnetic Interference Characteristics, 80 Pages, 1967.
Military Standard 462D, Measurement of Electromagnetic Interference Characteristics, 203 Pages, 1993.
Military Standard 464, Electromagnetic Environmental Effects Requirements for Systems, 116 pages, 1997.
Military Standard 464A, Electromagnetic Environmental Effects Requirements for Systems, 121 pages, 2002.
Military Standard 469B, Radar Engineering Interface Requirements, Electromagnetic Compatibility, 98 Pages, 1996.
Military Standard 1542B (USAF), Electromagnetic Compatibility and Grounding Requirements for Space System Facilities, 52 Pages, 1991.
Military Handbook 1195, Radio Frequency Shielded Enclosures, 86 Pages, Sep. 1988.
IEEE Std 299-1997, IEEE Standard Method for Measuring the Effectiveness of Electromagnetic Shielding Enclosures, 44 Pages, 1997.
Leland H. Hemming, Architectural Electromagnetic Shielding Handbook—A Design Specification Guide, IEEE Press, 232 Pages, 1991.
USAF Handbook for the Design and Construction of HEMP/TEMPEST Shielded Facilities, AF Regional Civil Engineer Central Region, Dallas, Texas, 39 Pages, 1986.
ETS-LINDGREN—High Performance EMI/RFI Shielding Solutions, 2 Pages, 2002.
ETS-LINDGREN—Double Electrically Isolated RF Enclosures, For Industrial, Communication, and Research and Development Applications, 8 Pages, 2005.
ETS-LINDGREN—Tempest Information Processing System (TIPS), 2 Pages, 2008.
ETS-LINDGREN—Table Top Enclosure—5240 Series, 2 Pages, 2009.
ETS-LINDGREN—Auto Latching Door System, 2 Pages, (undated).
ETS-LINDGREN—RF Shielded Doors, 5 Pages, (undated).
NSA-94-106, National Security Agency Specification for Shielded Enclosures, 9 Pages, 1994.
Holland Shielding Systems BV, Shielding Gaskets With or Without Water Seal (EMI-RFI-IP Gaskets), 2 Pages, (undated).
Holland Shielding Systems BV, EMI-RFI-EMP—Shielded Doors for Faraday Cages and EMI-RFI Shielded Room, 5 Pages, (undated).
Holland Shielding Systems BV, Innovative EMI Shielding Solutions—Gasket Selection, 36 Pages, (undated).
Equipto Electronic Corporation—Technical Guide to EMI/RFI Suppression in Electronic Cabinets, 16 Pages, Apr. 2005.
Crenlo-Emcor-Product-Options-Doors, 12 Pages, (undated).
RFI/EMI Shielded Cabinets and Features Available, 4 Pages, (undated).
Special Door Company, Radiation Shielding Doors: SH Door Tech, 2 Pages, (undated).
Special Door Company, EMP Doors: Electro Magnetic Pulse Doors, 3 Pages, (undated).
Braden Shielding Systems, Anechoic Chambers, EMC Chambers, MRI Enclosures, 1 Page, (undated).
Magnetic Shield Corp.—Bensenville, Illinois, Magnetic Shielding, 2 Pages, (undated).
EEP—Electromagnetic Radiation Shielding & Magnetic Field Shielding Technology—Products and Services, 3 pages, (undated).
FLEMING—RF & EMI Shielded Doors, Radiation Shielded Doors, 3 Pages, (undated).
H. Bloks, "NEMP/EMI Shielding," EMC Technology, vol. 5, No. 6, Nov.-Dec. 1986, 5 Pages.
W.E. Curran, "New Techniques in Shielding," ITEM, 1984, 9 Pages.
W. E. Curran, "Shielding for HEMP/TEMPEST Requirements," ITEM, 1988, 10 Pages.

* cited by examiner

ELECTROMAGNETICALLY-SHIELDED PORTABLE STORAGE DEVICE

CROSS-REFERENCE TO RELATED APPLICATIONS

The present application claims priority to U.S. Provisional Patent Application No. 61/330,752, filed May 3, 2010, and U.S. Provisional Patent Application No. 61/330,762, filed May 3, 2010, the disclosures of both of which are hereby incorporated by reference in their entireties.

TECHNICAL FIELD

The present application relates generally to portable computer data storage devices. In particular, the present application relates to electromagnetically-shielded portable storage devices.

BACKGROUND

Portable storage devices are often used to transport electronic data from place to place. For example, a user may wish to transport data on a portable storage device such as a portable hard drive or other recordable medium if that data relates to personal information, business information, or other information of a type valuable to that user. Because the user values the data stored on these portable devices, the user will wish to minimize the risk of data loss, e.g., due to data corruption or deletion.

In another example, a network-attached storage (NAS) is file-level computer data storage connected to a computer network providing data access to heterogeneous network clients. Typically, a NAS unit is a computer connected to a network that provides file-based data storage services to other devices on the network. NAS devices can be located at any of a number of locations, and typically store information important to businesses and users. Consequently, NAS devices require some level of protection to prevent against data loss.

One type of data loss occurs upon exposure of a portable storage device to high levels of electromagnetic interference, such as an electromagnetic pulse (EMP) or other intentional electromagnetic interference (IEMI). These pulses can cause data erasure or corruption, or can render portable storage devices inoperable. One way to protect against such electromagnetic interference is to enclose a portable storage device in a protective enclosure. Although some protective enclosures exist, those enclosures are typically intended to prevent against physical damage (e.g., due to moisture or impact). These enclosures typically do not provide sufficient EMP and IEMI protection to withstand known EMP or IEMI risks, particularly radiated and/or conducted interference through any power inputs and communications data lines used with such devices.

For these and other reasons, improvements are desirable.

SUMMARY

In accordance with the following disclosure, the above and other issues are addressed by the following:

In a first aspect, an electromagnetically shielded portable storage device is disclosed. One such device includes an electromagnetically shielded enclosure having an interior volume, the electromagnetically shielded enclosure including a plurality of shielded walls and sized to be manually carried by a person. The interior volume of the enclosure is isolated from radiative high-frequency electromagnetic energy generated external to the enclosure. The device includes at least one storage device positioned within the interior volume, and at least one communicative connection extending from the at least one storage device to a communicative socket accessible external to the electromagnetically shielded enclosure. The at least one communicative connection is configured to allow access to the storage device by a computing system external to the electromagnetically shielded enclosure. The device also includes an electromagnetic filter positioned at least partially within the electromagnetically shielded enclosure, and including a low-pass filter selected to prevent spurious or intentional conductive high-frequency electromagnetic energy from entering the interior volume via the communicative connection.

In a second aspect, an electromagnetically shielded portable storage device is disclosed. The device includes a hand-held-sized electromagnetically shielded enclosure having an interior volume, the electromagnetically shielded enclosure including a plurality of shielded walls, the interior volume isolated from radiative high-frequency electromagnetic energy generated external to the enclosure. The device further includes a storage device positioned within the interior volume, and a communicative connection extending from the at least one storage device to a communicative socket accessible external to the electromagnetically shielded enclosure, the at least one communicative connection configured to allow connection of the storage device to a computing system. The device also includes an electromagnetic filter positioned at least partially within the electromagnetically shielded enclosure, the electric filter including a low-pass filter selected to prevent spurious or intentional conductive high-frequency electromagnetic energy from entering the interior volume via the communicative connection.

In a third aspect, an electromagnetically shielded network-attached storage device is disclosed. The network-attached storage device includes an electromagnetically shielded enclosure having an interior volume and including a plurality of shielded walls, the enclosure sized to be manually carried by a person. The interior volume is isolated from radiative high-frequency electromagnetic energy generated external to the enclosure. The network-attached storage device includes a plurality of storage devices positioned in a storage device array within the interior volume, and a disk controller within the interior volume, the disk controller configured to receive data via the communicative connection and store that data on one or more of the array of storage devices. The network-attached storage device further includes a power connection comprising an electrical power cable having at least a portion residing externally to the electromagnetically shielded enclosure and a power filter positioned along a perimeter of the electromagnetically shielded enclosure and arranged to filter high-frequency energy on the portion of the electrical power cable external to the electromagnetically shielded enclosure. The network-attached storage device also includes at least one communicative connection comprising a communicative socket accessible external to the electromagnetically shielded enclosure and configured to allow communication with the disk controller by a computing system external to the electromagnetically shielded enclosure and an electric filter at least partially positioned within the electromagnetically shielded enclosure and including a low-pass filter selected to prevent spurious or intentional conductive high-frequency electromagnetic energy from entering the interior volume via the communicative connection. The network-attached storage device includes one or more vents through at least one of the shielded walls, each vent including a waveguide-beyond-cutoff positioned across the vent, the waveguide beyond cutoff having a plurality of cells sized to filter electromagnetic energy below a design frequency associated with an electromagnetic event passing through the vent.

DETAILED DESCRIPTION

In general, the present disclosure relates to electromagnetically shielded portable storage devices (SPSD). Such devices can include, for example, handheld-sized, portable hard-drive or portable memory-based systems, or other generally portable systems, such as network attached storage devices or other storage device types.

In connection with the following disclosure, shielded devices are disclosed which will provide protection from high amplitude electromagnetic pulse and intentional electromagnetic interference (IEMI) events, up to and including intense intentional interference specifically meant to harm electronic components and data. Therefore, data critical for business continuity, data retention compliance, and forensic evidence will be secure through such events. Likely users of such devices include consumers, small business, and commercial users desiring to protect vital data or records that would otherwise be lost in an electromagnetic event. This is appropriate for users who require portable protected storage, as well as remote or networked storage.

Figure 1:
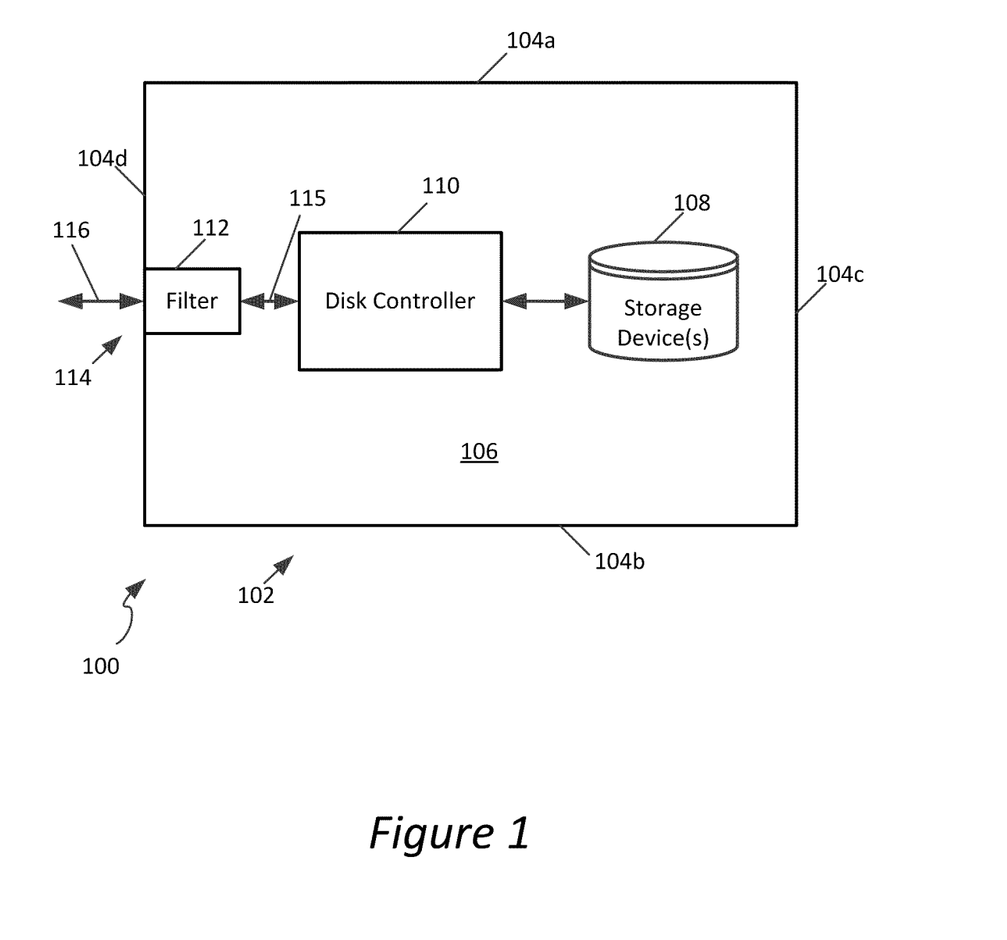
FIG. 1 is a generalized schematic view of an electromagnetically shielded storage device, according to a possible embodiment of the present disclosure.

Referring now to FIG. 1, an example generalized shielded portable storage device 100 is disclosed. The device 100 includes an enclosure 102. The enclosure 102 generally provides electromagnetic shielding from events having frequencies between about 10 kHz and about 10 GHz. The enclosure 102 has a plurality of walls 104a-d; in the embodiment shown, the walls 104a-d form a generally rectangular enclosure. However, in other embodiments, more or fewer walls of differing shapes or lengths could be used, thereby forming an enclosure of different shape or size. In the embodiment shown, the walls 104a-d (and therefore enclosure 102) are formed from a milled aluminum, and are between ⅛ and ¼ inches thick. Other thicknesses could be used as well, such that the combination of material and thickness is sufficient to provide shielding from electromagnetic events external to the enclosure.

The enclosure 102 can include one or more pieces, for example a main enclosure frame and cover arrangement (e.g., as illustrated in conjunction with the network attached storage device of FIGS. 5-8), or a wall-on-frame arrangement or some other type of enclosure construction. In cases in which multiple pieces are used to form an enclosure, the enclosure can optionally include a gasket positioned along a boundary between the pieces of the enclosure to ensure a continuous seal preventing high frequency energy from entering the enclosure 102. For example, in such embodiments, the two halves of the case can be joined with a conductive gasket that is designed to meet the military standard MIL-DTL-83528C for electromagnetic suppression and DEF STAN 59-103 for electromagnetic pulse survivability.

The enclosure 102 can be any of a variety of sizes, and is generally handheld-sized or otherwise capable of being manually moved by an individual person. In some embodiments, the enclosure 102 is sized at less than about 10 inches by about 10 inches by about 12 inches. In another embodiment, the enclosure 102 can be approximately 1-3 server rack units in size. In a further embodiment, the enclosure 102 is sized to fit in a hand of a user, for example about 3.5 inches by about 2 inches by about 6 inches. Other sizes and form factors could be used as well.

The enclosure 102 defines an internal volume 106 sized to receive a storage device 108, controller 110, and at least one electrical filter 112. The internal volume 106 typically has a perimeter defined by an interior of the walls 104a-d, however, in some embodiments, one or more internal walls within the enclosure 102 provide shielding within the enclosure 102, and therefore the interior volume 106 will not encompass the entire interior of the enclosure.

The storage device 108 within the enclosure 102 can be any of a number of types of storage devices, and is typically a non-volatile memory device capable of transport without a corresponding power supply. Example storage devices include hard disk drives, solid state drives, flash memory devices, rewritable optical disk drives, or other types of magnetic, electromechanical, or optical devices. In accordance with the present disclosure, the storage device 108 can be of any of a number of generally compact sizes. In one example embodiment, the storage device 108 is a 2.5 inch portable storage drive.

The controller 110 can be any of a number of types of device controllers, such as a microcontroller, processor, or other programmable circuit configured to manage receipt of communicated data at the device 100 and storage of that data in the storage device 108. Example controllers can be a USB-to-memory type communication controller, such as are available in any of a variety of flash drive devices. Other controllers could be used as well.

The electrical filter 112 is positioned along a periphery of the enclosure 102 for example at least partially within the enclosure 102. The electrical filter 112 is placed on a communication line 114 that enters the enclosure to reach the interior volume 106. The electrical filter 112 generally allows the communication line 114 to extend from external to the enclosure 102 to the controller 110. In some embodiments, the electrical filter 112 provides at least about 50 dB of attenuation of any radiated electromagnetic energy inducing a current or other spurious or intentional electrical or electromagnetic energy along the communication line 114. As such, a portion of the communication line 115 within the enclosure 102 can be referred to as "protected" while the portion of the line 116 external to the enclosure 102 can be referred to as "unprotected". In some embodiments, the electrical filter 112 is positioned proximate to a socket or other connection mechanism allowing connection of an external communication cable to the storage device 108 within the enclosure 102.

The communication line 114 can be any of a number of different types of communication lines, and accordingly the associated socket can be any of a number of types of sockets. Some example socket and communication line types are discussed below, and can include, for example, a serial (e.g., RS-232) cable line, a USB connection, a network cable (e.g., including an RJ-45 connection), or other similar connections.

Figure 2:
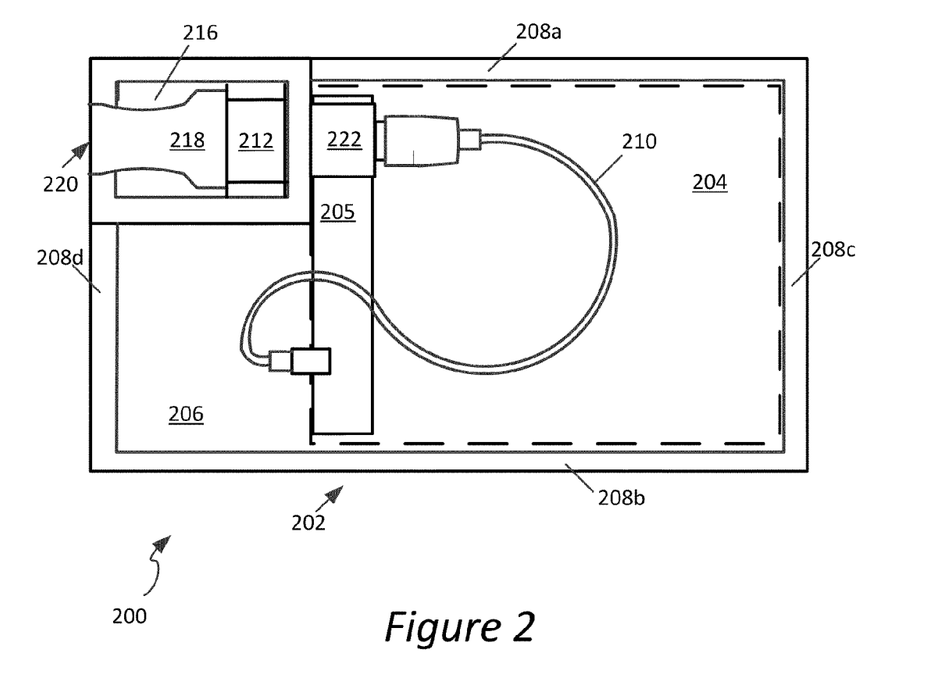
FIG. 2 is a generalized top schematic view of an electromagnetically shielded portable storage device, according to a first possible embodiment of the present disclosure.
Figure 3:
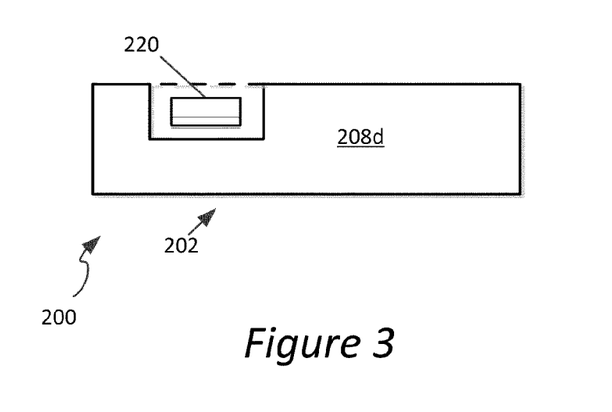
FIG. 3 is an end schematic plan view of the electromagnetically shielded portable storage device of FIG. 2.

Referring to FIGS. 2-3, a first example embodiment of a particular layout for an electromagnetically shielded portable storage device 200 is shown. In this embodiment, the electromagnetically shielded portable storage device 200 is generally a handheld-sized storage device, for example including a portable hard drive (e.g., a hard disk drive or solid state drive). The device 200 includes an enclosure 202 housing a storage device 204 within an interior volume 206. The enclosure 202 is generally sized to accommodate the storage device 204; in the embodiment shown, the interior volume 206 has dimensions of approximately 2.5 inches wide by about 5 inches long by about 2 inches deep. Other dimensions could be used as well. The enclosure 202 is generally rectangular shaped, and formed from milled aluminum or steel. In the embodiment shown, the enclosure 202 has a plurality of side walls 208a-d, each of which can be about ⅛ to ¼ inches thick (although other thicknesses could be used as well). In certain embodiments, the shielded portable storage device 200 connects using a standard Type A USB connection, and provides 50 dB of attenuation of radiated and conducted electromagnetic energy from 200 MHz to 10 GHz. Such embodiments provide substantial protection against unintentional or intentional electromagnetic interference, including high altitude electromagnetic pulse and radio frequency weapons.

In the embodiment shown, the storage device 204 is generally a compact, high-capacity storage device capable of being used as an external storage system in conjunction with a computing system. A typical example of a storage device 204 is a 2.5" format storage drive (solid state disk (SSD) or hard disk drive (HDD), of the type used in laptops. Such devices typically have an IDE or Serial-ATA connection configured to send and receive data at the device, and an integrated data storage controller configured to manage storage of data onto the physical memory device media included therein.

In the embodiment shown, the storage device 204 includes a conversion circuit board 205, which is used to convert a native communication format used by the storage device 204 to a second data format, for example a USB format. Other formats, such as Firewire, Thunderbolt (in the case of optical connection technology), or analogous formats could be used as well. Alternatively, if the native format of the storage device 204 is acceptable for external connection to a computing system (e.g., Serial-ATA), no conversion circuit board 205 may be needed.

In the embodiment shown, the storage device 204 connects to a communication wire 210 at the conversion circuit board 205. The communication wire 210 leads to an format converter 222 and an electrical filter 212. The electrical filter 212 is positioned within the enclosure 202 at a boundary between the interior volume 206 and a second interior volume 216. The second interior volume 216 is, in the embodiment shown, a generally unprotected region including an aperture through which a connector can extend, allowing connection of the shielded storage device to an external computing system. In the embodiment shown, a serial data filter is used; in such embodiments, format converters 218 and 222 are also employed to convert from the data format carried on the communication wire 210 to a format useable at the electrical filter 212. In this embodiment, the filter 212 is a serial line filter placed across each of the data lines of a serial connection, and the format converters 222 and 218 convert between serial data and a USB connection, such as a 5 volt, 500 mA power and full bandwidth USB 2.0 connection within the enclosure 202. Preferably, the electrical filter 212 provides at least about 50 dB of attenuation, protecting incoming power and data into the enclosure 202. In embodiments requiring additional attenuation, the attenuation can be increased by various means, including, for example, use of a silicone filter inserted into the electrical filter 212.

In the embodiment shown, a second internal volume 216 within the enclosure 202 includes a connector 220 (shown as a USB connection in FIG. 4) accessible external to the enclosure 202. In the embodiment shown, the connector 220 receives the connection from the filter 212 and transmits signals external to the enclosure 202 in a further electrical communication format. In the embodiment shown, this further electrical communication format is a USB data format. In use, a user can connect the shielded portable storage device 200 to a computing system via a USB connection. Other data formats could be used as well. Optionally, the enclosure 202 can include an additional connector therethrough, for example also passing through the second interior volume 216. This additional connector could, for example, provide power to the storage device 204, and could use a different filter depending upon the particular requirements for power delivery to the storage device 204. However, in embodiments where the serial data connection also allows for power delivery to the storage device 204, no additional connector may be necessary.

Referring to FIGS. 2-3, it is recognized that although USB and serial connections are discussed, other communicative connections could be used as well, consistent with the present disclosure. The use of multiple formats may be possible in cases where a storage device, such as storage device 204, implements a communicative connection for which a suitable filter is not readily available. In such cases, conversion to a second format for which filtering is straightforward may be used.

Figure 4:
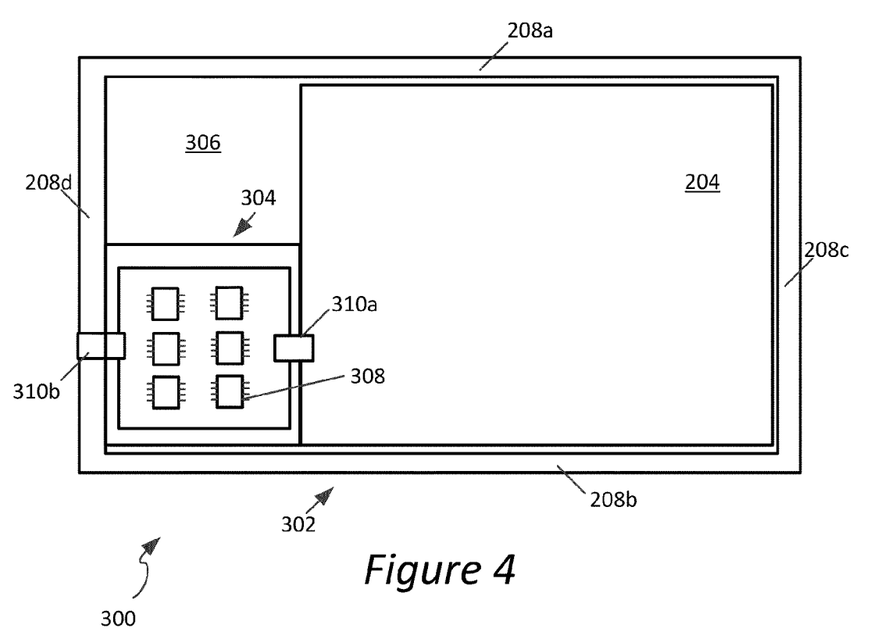
FIG. 4 is a generalized top schematic view of an electromagnetically shielded portable storage device, according to a second possible embodiment of the present disclosure.

Referring now to FIG. 4, a further example of a possible secure portable storage device 300 is shown, in which a different enclosure and communicative connection arrangement is shown. In general, the secure portable storage device 300 corresponds to that shown in FIGS. 2-3, but does not require use of format converters 218 and 222. As such, in this embodiment, an enclosure 302 is generally as described above, but lacks the second internal volume 216. Rather, a filter 304 is positioned within an interior volume 306 that allows filtering of USB-formatted serial data without needing to convert that data to a different serial format. In the example embodiment shown the filter 304 can be a USB 2.0 filter, filtering electromagnetic signals over 5V in amplitude and between about 10 kHz and 10 GHz in frequency. Other types of filters could be used as well. In the embodiment shown, the filter 304 is a modular, self-contained filter including one or more integrated circuits 308 useable for detecting and filtering out interference events, as well as connectors 310a-b useable for connection to the storage device 204 and an external USB device interface (e.g., USB, USB 2.0, USB 3.0, miniUSB, microUSB, or other format) of a computing system. In such an arrangement, a USB cable could be connected to the connector 310b, leading from the portable storage device to the computer to which it can be connected. Other layouts of the filter 304 are possible as well.

In this embodiment, the portable storage device 300 does not require a secondary power source, and will need only one access point into the interior volume 306 for connector 310. This is because connector 310b, like other USB devices provides both power and data connections, and typical USB connected storage devices require only the power delivered by the USB standard connector (e.g., less than the 500 mA limit of the current USB 2.0 interface).

Referring now generally to FIGS. 2-4, it is noted that, in some embodiments, the enclosures 202, 302 can be constructed of two or more pieces, and are capable of disassembly to insert or remove a storage device 204 within the interior volume 206, 306, respectively. This allows a user to travel with a single protected storage device, while reusing the enclosure for cost savings. This is because, for example, current commercially available unshielded devices typically consist of a single 2.5" format storage drive capable of storing about 1000 gigabytes for 2.5" format disk drive, and 500 gigabytes for 2.5" format solid state storage device.

Furthermore, although the example devices 200, 300 described above utilize SATA and USB interfaces for accessing the storage device 204 to read/write information, these interfaces are non-critical for purposes of shielding. Hence, different technologies beyond these could be used for the portable storage device 200, 300. For example, changes to an interface (e.g., SATA) or USB protocol and hardware (for example, including a new USB 3.0 protocol) can be incorporated into future versions of the devices 200, 300. Such new devices could, in certain embodiments, include a fiber optic connection, which would allow greater protection levels than those attainable using current conductive wire technologies.

Additionally, enclosures 202, 302 entirely enclose the interior volumes 202, 302, such that airflow is prevented into the interior volume 206, 306, respectively. This is because, in such embodiments, storage device 204 does not require forced or fan-based cooling. Rather, radiative cooling is sufficient to prevent failure of the device 204. In particular, in the embodiments shown, contact between the storage device 204 and the metal enclosures 202, 302 provide a mechanism for heat dissipation. In other embodiments, one or more apertures through the enclosures 202, 302 can be provided to allow airflow into the interior volume 206, 306; in such embodiments, a honeycomb filter, such as the waveguide-beyond-cutoff arrangements discussed below in connection with FIGS. 5-9, would be used to prevent electromagnetic signals from entering the enclosures via such apertures.

It is noted that, when the devices 200, 300 are in use, even if a computing system interfaced to and utilizing such a device were compromised in an electromagnetic event, the data and the drive interface within the interior volume 206, 306 of each device 200, 300 would be protected, substantially decreasing recovery time from such an event.

Referring now to FIGS. 5-8, an example network attached storage device 400 is disclosed which can implement further aspects of the present disclosure. In the embodiment shown, the network attached storage device 400 is generally sized for portability, in that it is sized to be carried manually by a person. As such, the network attached storage device 400 corresponds to a shielded portable storage device, as generally disclosed above.

In various embodiments, the network attached storage device 400 includes an enclosure 402 that is approximately 10 inches tall by 10 inches wide by about 12 inches deep; however, in alternative embodiments, other sizes of enclosures could be used as well. For example, in some embodiments, the enclosure 402 can be configured for use of the network attached storage device as a server rack-mounted device, typically of 1-3 server rack units in size. Other form factors could be used as well.

In the embodiment shown, the enclosure 402 has a rear cover 403 (shown in FIG. 6) that can be removed via fastener locations 404 (e.g., screws and corresponding screw locations), to allow access to an interior volume 406, for example for maintenance purposes. The enclosure 402 and rear cover 403 isolate the interior volume 406 from electromagnetic energy occurring externally to the enclosure 402, thereby protecting components within the interior volume 406 analogously to devices 100-300 described above. As with the previously-described portable storage devices 200, 300, a gasket can be located along the surface joining the enclosure 402 and rear cover 403, ensuring a continuous, shielding connection when the cover 403 is affixed to and included in the enclosure 402. In some embodiments, the pieces of the enclosure 402 are joined with a conductive gasket that is designed to meet the military standard MIL-DTL-83528C for electromagnetic suppression and DEF STAN 59-103 for electromagnetic pulse survivability. In further embodiments, the enclosure 402 meets Military Standard No. 188-125 for HEMP protection.

Figure 5:
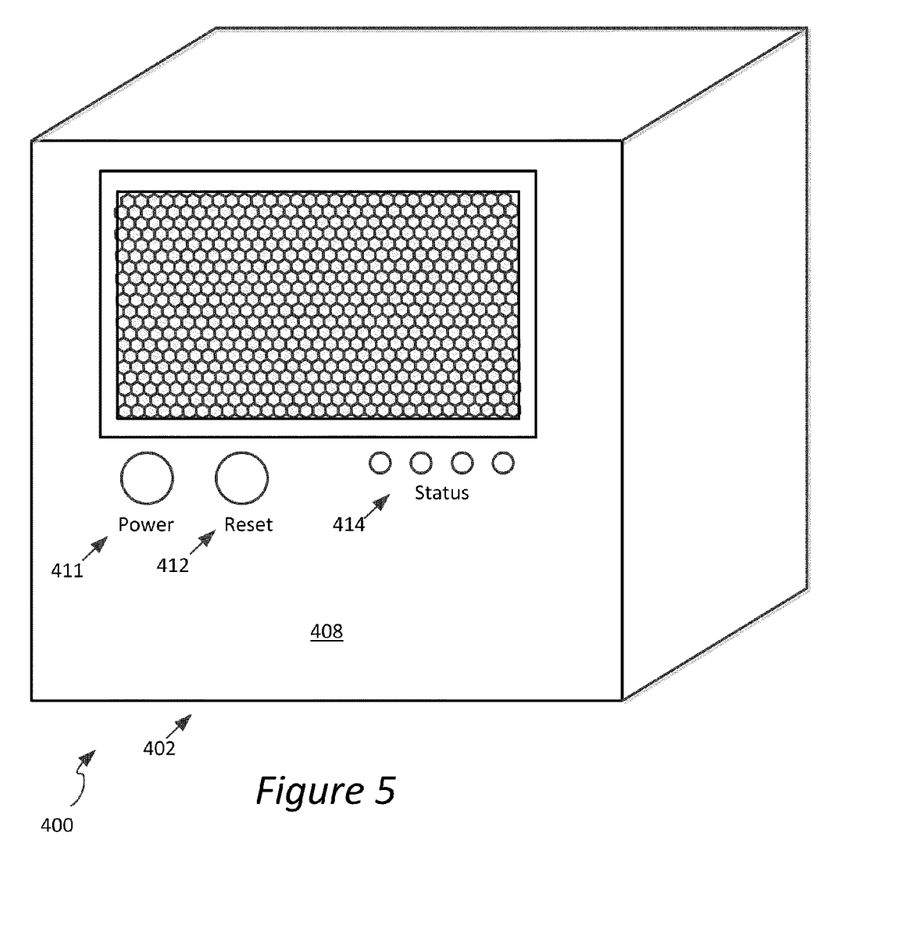
FIG. 5 is a schematic front perspective view of a network attached storage device, according to a possible embodiment of the present disclosure.

In the embodiment shown, the network attached storage device 400 has a front face 408 and a rear face 410. The front face 408 includes a power button 411, a reset button 412, and a plurality of status indicators 414. The power button 411 and reset button 412 allow a user to activate the network attached storage device 400, for example for remote access by another computing system. The status indicators 414 can be, for example an LED-based indicator arrangement configured to convey the current operational status of the network attached storage device 400.

Figure 6:
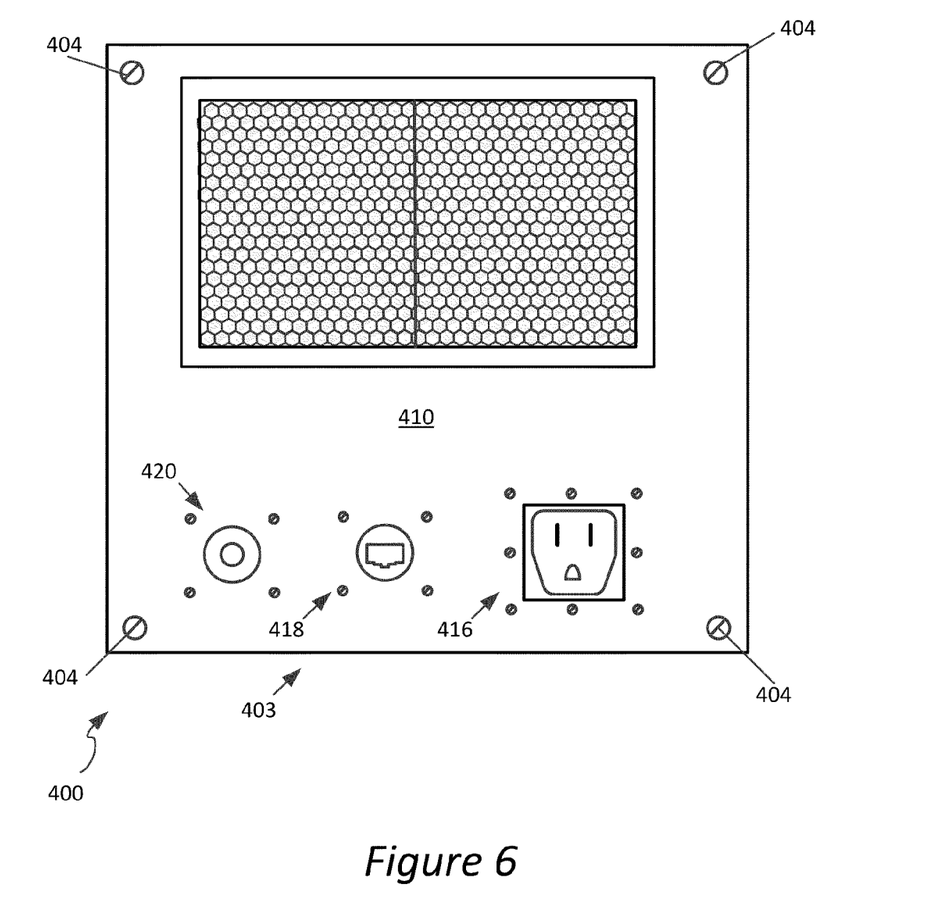
FIG. 6 is a schematic rear plan view of the network attached storage device of FIG. 5.

The rear face 410 includes a plurality of mounting locations for filter modules, including a power filter module 416 and a communication filter, either filter module 418 or an optical filter module 420. The power filter module 416 is generally configured to receive incoming, unfiltered power from external to the network attached storage device 400 and provide filtered power to components within the network attached storage device 400. Although in the embodiment shown the power module 416 is configured to receive a standard wall-outlet (e.g., 60 Hz, 120 V) connection, other power inputs could be used as well. The power module 416 is in the embodiment shown mounted at least partially within the network attached storage device 400; additional details regarding a possible physical arrangement of the power filter module 416 are described below in connection with FIG. 10.

The communication filter module 418 is configured to receive and transmit electrical communication signals to/from components within the network attached storage device 400. External to the network attached storage device 400, these signals will typically not be filtered, and are subject to possible interference by electromagnetic events; however, within the interior volume 406 (i.e., on an opposite side of the communication filter module 418 from that shown), a network connection could be made to components within the network attached storage device 400 that is filtered from extraneous and potentially harmful electromagnetic events occurring externally to the enclosure 402. The communication filter module 418 is in the embodiment shown mounted at least partially within the network attached storage device 400; additional details regarding a possible physical arrangement of the communication filter module 418 are described below in connection with FIG. 11. In the embodiment shown, the communication filter module 418 receives an RJ-45 based network jack and associated cable; in alternative embodiments, other types of communication connections could be used.

The optical input module 420 provides analogous two-way communication of data between components internal to the network attached storage device 400 and external computing systems or networks. In some embodiments, the optical input module 420 may not be present; in others, the optical input module 420 can be included in place of the communication filter module 418, for example in circumstances where optical network connections exist. In such embodiments, if optical signals are received at the network attached storage device 400, they may be converted to electrical signals prior to reaching components internal to the network attached storage device 400. In this case, the conversion to electric signals can take place inside the shielded volume, eliminating the need for an electrical filter, such as communication filter module 418. Other filtering arrangements are possible as well. In an example embodiment, the optical filter module 420 is a waveguide beyond cutoff capable of a minimum of 100 dB attenuation of radiated frequencies below 10 GHz for unwanted/spurious or intentional signals.

Figure 7:
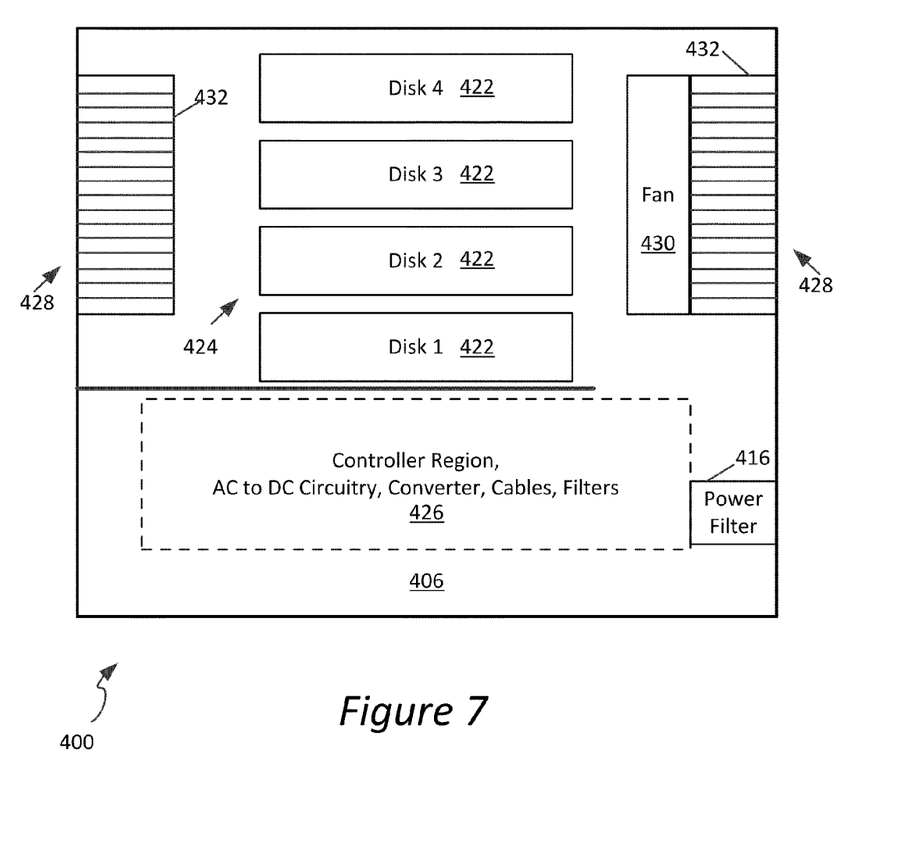
FIG. 7 is a schematic side layout view of the network attached storage device of FIG. 5.
Figure 8:
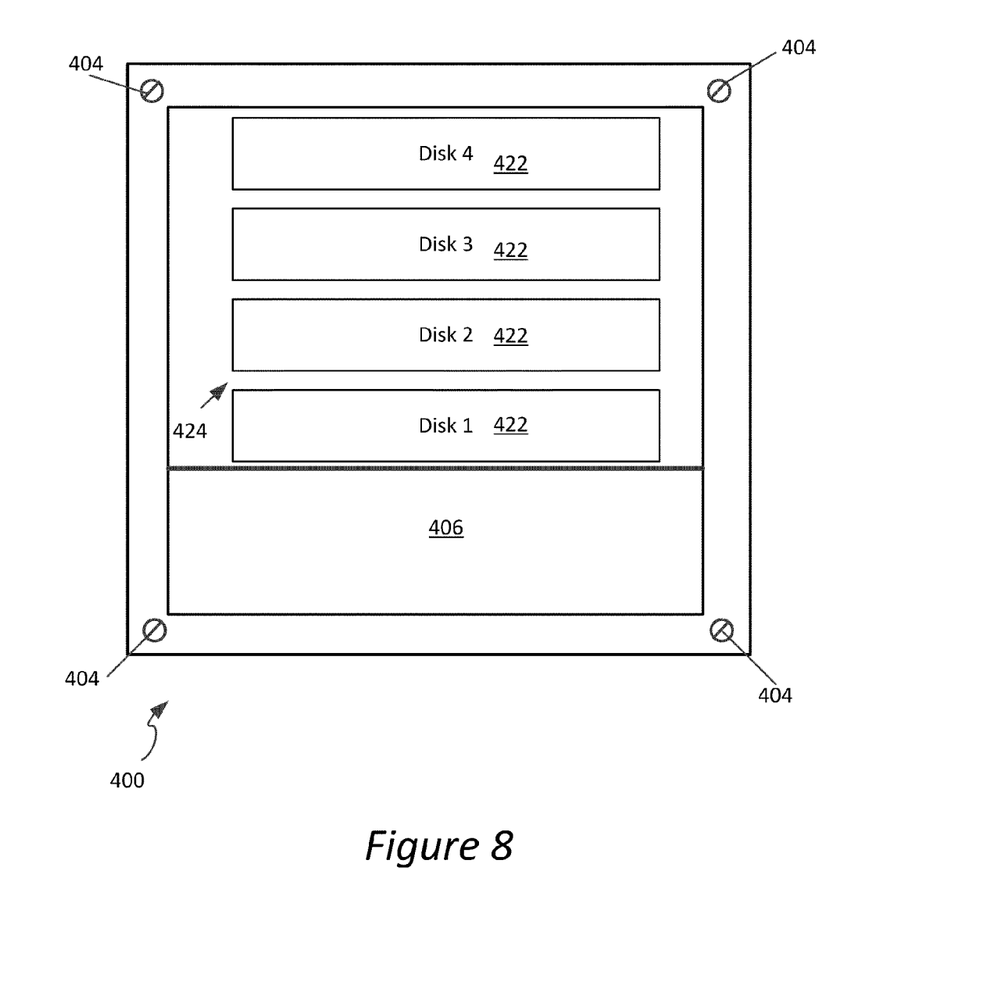
FIG. 8 is a schematic rear plan view of the network attached storage device of FIG. 5 with the rear cover removed.

Referring now specifically to FIGS. 7-8, an example arrangement of components within the interior volume 406 of the network attached storage device 400 is illustrated. It is noted that this arrangement is intended for example purposes only, and that other arrangements of components could be used as well.

In the embodiment shown, the network attached storage device 400 includes a plurality of storage devices 422 arranged in an array 424. In the embodiment shown, the storage devices 422 are typically 3.5" format drives, ubiquitous in servers and desktop computer systems. In certain example devices, the limit is 3000 gigabytes for each of the storage devices if hard disk drives are used, and 1000 gigabytes if solid state drives are used. Although in the embodiment shown four storage devices 422 are included in the network attached storage device 400, typical devices can include between 1 and 10 individual storage devices. In various embodiments, a user can elect to add or remove storage devices from the network attached storage device 400, for example to add or remove capacity from the device 400, or in the case of a failed storage device 422.

The network attached storage device 400 also includes a controller region 426. In the embodiment shown, the controller region 426 is located below the array 424 of disks; however, in other arrangements, the controller region 426 can be located elsewhere within the enclosure 402. The controller region 426 generally includes a controller configured to manage communication via a communication connection, e.g., a network connection, and storage on the one or more storage devices 422 included within the network attached storage device 400. The controller region 426 can also include, in various embodiments, alternating current to direct current circuitry (for conversion of filtered power received via the power filter module 416), as well as one or more additional cables and data filters required for routing data received from an external network to one or more of the storage devices 422, or vice versa.

It is noted that, during operation of the network attached storage device 400, the power conversion and controller circuitry, as well as the array 424 of storage devices 422 will typically generate some heat. In the embodiment shown, openings 428 on the front face 408 and rear face 409 of the enclosure 402 allow airflow through the interior volume 406. Additionally, one or more fans 430 can be located within the enclosure and proximate to one of the openings, to draw air through the interior volume 406. Although the openings 428 are illustrated for purposes of cooling, these openings would in other embodiments be eliminated if forced airflow cooling were not employed.

To prevent radiative electromagnetic event energy from entering the interior volume 406 via the openings 428, a waveguide-beyond-cutoff vent 432, also referred to herein as a honeycomb vent, is located across each of the openings 428. The waveguide-beyond-cutoff vent 432 is generally an array of honeycomb-shaped cells configured in size and length to filter radiated waves received at the network attached storage device 400. Details of an example waveguide-beyond-cutoff vent 432 are discussed below in conjunction with FIG. 9.

Overall, it is noted that the particular size of the network attached storage device 400 overall is to some extent dictated by the size and number of storage devices 422 included within that storage device. For example, the network attached storage device 400 could vary in physical size to contain 1 or more storage devices 422. Additionally, use of lower power storage devices (for instance solid state drives) could reduce the cooling requirements of the network attached storage device 400 need to the point where airflow through a waveguide beyond cutoff is not required. Other possibilities exist as well for varying layout of the overall system.

Figure 9:
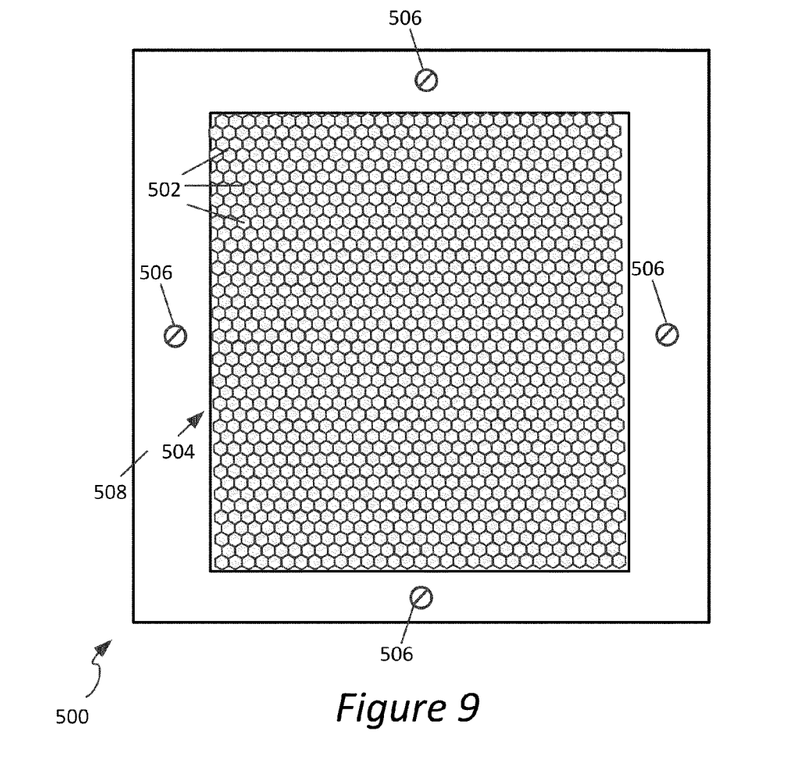
FIG. 9 is a schematic layout view of a waveguide beyond cutoff frequency useable in conjunction with one or more of the portable storage devices according to the present disclosure.

Referring now to FIG. 9, a schematic layout view of a waveguide-beyond-cutoff vent 500 useable in conjunction with one or more of the portable storage devices 100-400 of the present disclosure is shown. The waveguide-beyond-cutoff vent 500 can be used, for example, as waveguide-beyond-cutoff 432 associated with the network attached storage device 400, or with any other portable storage device requiring airflow cooling.

As illustrated, the waveguide beyond cutoff vent 500 has a plurality of generally open, honeycomb-shaped cells 502 configured in a two-dimensional array 504 configured to filter and prevent electromagnetic energy from passing into the device upon which it is mounted. Each honeycomb-shaped cell 502 has a length (illustrated in the example waveguide-beyond-cutoff vent 432 above as the depth from the edge of the enclosure 402 to the fan 430). The length of each cell 502 is selected to ensure that wavelengths longer than a particular length (i.e., which correlate to frequencies below a given selected frequency) cannot pass through that cell, while allowing air to flow through the cells 502 of the vent 500. As discussed above, in various embodiments, the cell shape and size can be configured to provide at least 80 dB of attenuation of radiated energy having a frequency of below about 10 GHz could be used. One example cell 502 could have a diameter of about 1/8 inch and be approximately one inch long. Other cell sizes could be used as well.

In the embodiment shown, the waveguide-beyond-cutoff vent 500 is generally constructed from a metal material, and similarly to the various portions of enclosures discussed above, can include a fastener 506 and associated gasket on a frame 508 surrounding the array 504. The frame 508 and gasket ensure an electromagnetic seal in place on a shielded enclosure, when installed over an opening of a portable storage device using fasteners 506. The waveguide-beyond-cutoff vent 500 can be any of a variety of sizes or shapes, depending upon the particular opening to be protected in the portable storage device with which it is associated.

Figure 10:
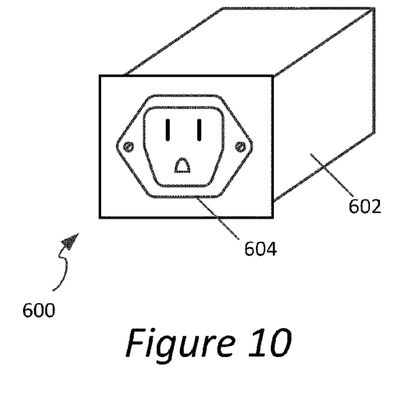
FIG. 10 is a schematic front perspective view of an example power filter module useable in a portable storage device according to the present disclosure.

FIG. 10 is a schematic front perspective view of an example power filter module 600 useable in a portable storage device according to the present disclosure. The power filter module 600 can be used as module 416 of the network attached storage device 400, or in any other analogous device with which a power connection is required. In the embodiment shown, the power filter module 600 includes a generally enclosed, metallic and shielded body 602, and a power outlet interface 604 configured to face in a direction external to a protected area. The body 602 is generally constructed to be mounted at least partially within an enclosure such as those discussed above. Various low-pass filter electronics cam be employed within an interior of the body 602. A filtered power output (not shown, extending from an opposite side of the module 600) can be connected to devices requiring reliable, filtered power, such as electronics located within a shielded enclosure as discussed herein. In other embodiments, the power filter module 600 can be any other module constructed to meet military standards for insertion loss under Military Standard 220C.

Figure 11:
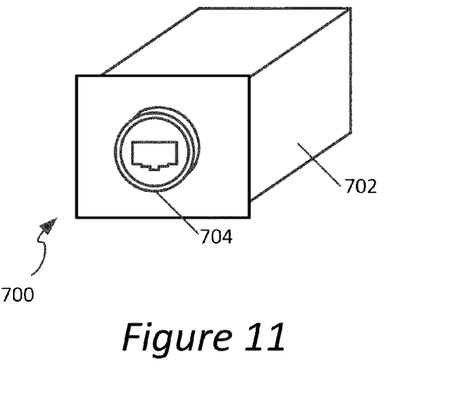
FIG. 11 is a schematic front perspective view of an example communication filter module useable in a portable storage device according to the present disclosure.

FIG. 11 is a schematic front perspective view of an example communication filter module 700 useable in a portable storage device according to the present disclosure. The communication filter module 700 can be used as module 418 of the network attached storage device 400, or in any other analogous device with which a communication connection is required. In the embodiment shown, the communication filter module 700 includes a generally enclosed, metallic and shielded body 702, and a communication interface 704. The body 702 is generally constructed to be mounted at least partially within an enclosure such as those discussed above. The communication interface 704 is configured to receive a connection from an external network (e.g., an RJ-45 jack or other communicative connection) and to receive and transmit data signals, thereby exchanging data between unfiltered and filtered data systems.

Referring to FIGS. 1-11 overall, and as illustrated and described herein, the secure portable storage devices described herein provide protection of portable storage drives and data from the disruptive and destructive effects of electromagnetic interference, up to and including intense intentional interference specifically intended to harm electronic components and data. Example waveforms to be shielded using the methods and systems of the present disclosure include, for example, waveforms having peak values greater than those provided by the specification under which a communication protocol operates, or of a frequency greater than provided by the interface. Although in various embodiments different frequencies may be defined for the particular interface and implemented in an associated filter for that interface, typical frequencies for communication interfaces remain lower than the expected frequencies for intentional or unintentional electromagnetic interference events capable of damaging a storage device used in conjunction with the embodiments herein.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An electromagnetically shielded portable storage device comprising:
    an electromagnetically shielded enclosure having an interior volume, the electromagnetically shielded enclosure including a plurality of shielded walls and sized to be manually carried by a person, the interior volume isolated from high-frequency electromagnetic energy generated external to the enclosure;
    at least one storage device positioned within the interior volume;
    at least one communicative connection extending from the at least one storage device to a communicative socket accessible external to the electromagnetically shielded enclosure, the at least one communicative connection configured to allow access to the storage device by a computing system external to the electromagnetically shielded enclosure;
    an electric filter positioned at least partially within the electromagnetically shielded enclosure, the electric filter including a low-pass filter selected to prevent spurious or intentional conductive high-frequency electromagnetic energy from entering the interior volume via the communicative connection.

2. The electromagnetically shielded portable storage device of claim 1, further comprising an array of storage devices communicatively interconnected and positioned within the interior volume.

3. The electromagnetically shielded portable storage device of claim 2, further comprising a disk controller within the interior volume, the disk controller configured to receive data via the communicative connection and store that data on one or more of the array of storage devices.

4. The electromagnetically shielded portable storage device of claim 3, further comprising a power connection including an electrical power cable having at least a portion residing externally to the electromagnetically shielded enclosure, the power connection further comprising a power filter positioned along a perimeter of the electromagnetically shielded enclosure and arranged to filter high-frequency energy on the portion of the electrical power cable external to the electromagnetically shielded enclosure.

5. The electromagnetically shielded portable storage device of claim 4, wherein the power connection provides electrical power to the array of storage devices and the disk controller.

6. The electromagnetically shielded portable storage device of claim 4, further comprising a vent through at least one of the shielded walls, allowing airflow through the electromagnetically shielded enclosure.

7. The electromagnetically shielded portable storage device of claim 6, further comprising a waveguide-beyond-cutoff frequency positioned across the vent, the waveguide beyond cutoff having a plurality of cells sized to filter radiative high-frequency electromagnetic energy, thereby preventing the electromagnetic energy from passing through the vent.

8. The electromagnetically shielded portable storage device of claim 1, wherein the electric filter is positioned at a periphery of the electromagnetically shielded enclosure.

9. The electromagnetically shielded portable storage device of claim 1, further comprising a second interior volume within the electromagnetically shielded enclosure, the second interior volume defining an unshielded region within the enclosure.

10. The electromagnetically shielded portable storage device of claim 1, wherein the electromagnetically shielded enclosure is less than about 10 inches wide by about 10 inches tall by about 12 inches deep.

11. The electromagnetically shielded portable storage device of claim 1, wherein the electromagnetically shielded enclosure is sized to fit within one or more rack units of a server rack.

12. An electromagnetically shielded portable storage device comprising:

A handheld-sized electromagnetically shielded enclosure having an interior volume, the electromagnetically shielded enclosure including a plurality of shielded walls, the interior volume isolated from radiative high-frequency electromagnetic energy generated external to the enclosure;

a storage device positioned within the interior volume;

a communicative connection extending from the at least one storage device to a communicative socket accessible external to the electromagnetically shielded enclosure, the at least one communicative connection configured to allow connection of the storage device to a computing system;

an energy filter positioned at least partially within the electromagnetically shielded enclosure, the energy filter including a low-pass filter selected to prevent spurious or intentional conductive high-frequency electromagnetic energy from entering the interior volume via the communicative connection.

13. The electromagnetically shielded portable storage device of claim 12, wherein the communicative connection comprises a Universal Serial Bus (USB) connection.

14. The electromagnetically shielded portable storage device of claim 12, wherein the storage device comprises a flash memory storage device.

15. The electromagnetically shielded portable storage device of claim 12, further comprising a second interior volume within the electromagnetically shielded enclosure, the second interior volume defining an unshielded region within the enclosure.

16. The electromagnetically shielded portable storage device of claim 15, wherein the handheld-sized electromagnetically shielded enclosure has exterior dimensions less than or equal to about 3.5 inches wide, 2 inches tall, and 6 inches deep.

17. The electromagnetically shielded portable storage device of claim 15, further comprising a serial data connection extending from the communicative connection to an exterior of the electromagnetically shielded enclosure, thereby providing communicative connection to the storage device.

18. An electromagnetically shielded network-attached storage device comprising:

an electromagnetically shielded enclosure having an interior volume, the electromagnetically shielded enclosure including a plurality of shielded walls and sized to be manually carried by a person, the interior volume isolated from radiative high-frequency electromagnetic energy generated external to the enclosure;

a plurality of storage devices positioned in a storage device array within the interior volume;

a disk controller within the interior volume, the disk controller configured to receive data via the communicative connection and store that data on one or more of the array of storage devices;

a power connection comprising:
an electrical power cable having at least a portion residing externally to the electromagnetically shielded enclosure; and
a power filter positioned along a perimeter of the electromagnetically shielded enclosure and arranged to filter high-frequency energy on the portion of the electrical power cable external to the electromagnetically shielded enclosure;

at least one communicative connection comprising:
a communicative socket accessible external to the electromagnetically shielded enclosure and configured to allow communication with the disk controller by a computing system external to the electromagnetically shielded enclosure;
an electric filter at least partially positioned within the electromagnetically shielded enclosure and including a low-pass filter selected to prevent spurious or intentional conductive high-frequency electromagnetic energy from entering the interior volume via the communicative connection; and one or more vents through at least one of the shielded walls, each vent including a waveguide-beyond-cutoff positioned across the vent, the waveguide beyond cutoff having a plurality of openings sized to filter radiative electromagnetic energy below a design frequency associated with an electromagnetic event passing through the vent.

19. The electromagnetically shielded network-attached storage device of claim 18, wherein the at least one communicative connection includes an Ethernet connection.

20. The electromagnetically shielded network-attached storage device of claim 18, wherein the at least one communicative connection includes a fiberoptic connection.

* * * * *